3,161,638
PURIFICATION OF MELAMINE
Ivan Christoffel and Delbert P. Schutz, Hopewell, Va., assignors to Allied Chemical Corporation, New York, N.Y., a corporation of New York
Filed Nov. 13, 1959, Ser. No. 852,685
9 Claims. (Cl. 260—249.7)

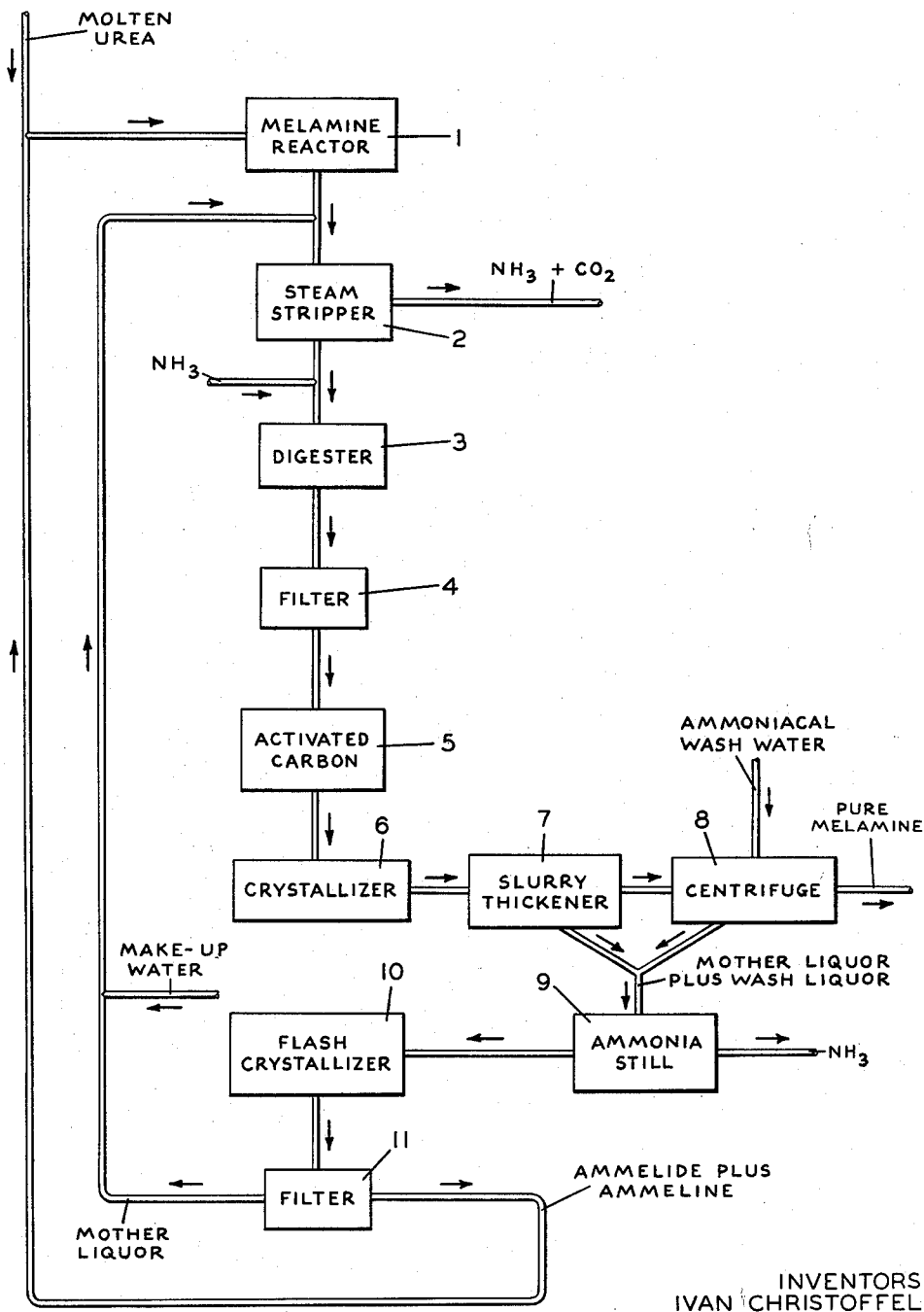

This invention relates to a process for the purification of a crude melamine containing impurities including hydroxy-triazines. More specifically, this invention relates to a process for the recovery of a purified melamine from a melamine synthesis effluent obtained by heating an aquo-ammono carbonic acid to form melamine. In these effluents the melamine is accompanied by genetic impurities, including hydroxy-triazines.

It is known that by heating an aquo-ammono carbonic acid, e.g., urea, biuret, cyanuric acid, ammelide or ammeline, alone or together with added ammonia, melamine is produced under suitably high temperatures and pressures. When an aquo-ammono carbonic acid, such as urea, is thus heated to produce melamine, it is known to quench the hot pyrolysis effluent with water to obtain a hot aqueous slurry or solution of melamine containing impurities and residual unreacted urea. This hot, e.g., 90° C. to 150° C. melamine solution under atmospheric or somewhat elevated pressure, is separated from the ammonia and carbon dioxide evolved under the lowered pressure and is filtered to remove undissolved material. The filtrate is cooled to temperatures of the order of 50° C. or lower at which the melamine crystallizes. The melamine is separated from its mother liquor and dried. The crude melamine thus produced usually contains about 96–97% melamine. Recrystallization by repeated solution in hot water and crystallization of the melamine, serves to reduce the impurity content of the thus recovered melamine product. But from the standpoint of practical application, there is a point below which the relative solubilities in water of the melamine and accompanying impurities will not permit further purification by this procedure. This point is reached while the recovered product still contains more than 1% impurities and less than 99% melamine, an undesirably high impurity content.

It has been proposed in U.S.P. 2,647,119, issued July 28, 1953, to dissolve a crude melamine, generally one prepared from dicyandiamide, in water containing melamine in solution. Insoluble material is filtered off and an alkali metal or alkaline earth metal hydroxide is added to the filtrate in an amount carefully regulated to give a solution having a pH of about 11.5 to below 13, from which the melamine is crystallized. Hydroxy-triazine contaminants present in the crude melamine remain in solution in the aqueous caustic liquor. This procedure has several limitations. Particularly, it requires a close control of the concentration of the caustic alkali present in the solution. Also the relatively low temperature of 100° C. or below, at which the solution of melamine is treated with the caustic, limits the amount of melamine which may be recovered from the treated solution by cooling it.

We have now discovered that by the following procedure a highly purified melamine may be obtained from a crude melamine produced by heating an aquo-ammono carbonic acid and accompanied by genetic impurities, including hydroxytriazine. The crude melamine is digested in an aqueous ammonia maintained at a concentration of about 8% to about 28% $NH_3$ by weight based on the ammonia and water present, by maintaining a dispersion of the melamine accompanied by genetic impurities in the aqueous ammonia at about 140° C. to about 230° C. The crude melamine may be dispersed in the aqueous ammonia either in the form of a solution or as solid suspended in a solution of the materials present. No more than 3% $CO_2$, by weight of total material, is present during this digestion of the crude melamine. The thus treated melamine is crystallized from its solution in an aqueous ammonia and thus separated from genetic impurities which have been solubilized (made more soluble in an aqueous ammonia) by the foregoing digestion with hot aqueous ammonia. The solid purified melamine thus obtained, is separated from its mother liquor containing in solution the solubilized impurities. It may be dried to obtain a solid, dry product suitable for marketing.

In preferred operation of our process, the amount of aqueous ammonia employed for this digestion of the crude melamine is sufficient to dissolve the melamine in the aqueous ammoniacal solution at the elevated temperature employed for the digestion. On the other hand, the digestion may be carried out employing insufficient aqueous ammonia to dissolve all the melamine present. In that case, however, additional water should be added to the digestion product and the melamine dissolved in the hot, aqueous ammoniacal liquor thus obtained before the solution is cooled or concentrated to crystallize out the purified melamine. It is preferred to prepare a hot solution of the melamine in a 12% to 24%, by weight, aqueous ammonia saturated with melamine at a temperature above 155° C., and to crystallize the purified melamine from such solution by cooling it to a temperature in the range about 30° C. to about 60° C.

The time required for digesting the crude melamine will vary according to the concentration of aqueous ammonia present and the temperature at which the digestion treatment is carried out. The lower the concentration of the ammonia present in the range 8% to 28% and the lower the temperature in the range 140° C. to 230° C. at which the digestion is carried out, the longer the time required to digest the impurities present to obtain an aqueous ammoniacal solution of the melamine and solubilized impurities from which melamine of the required degree of purity crystallizes from an aqueous ammoniacal solution of the digested solution. Suitable correlations of these conditoins will be given in specific examples embodying our invention. In initially operating a process under other selected conditions differing from those of the examples, but within the limits set forth herein, the minimum digestion time required to obtain the desired higher content of melamine in the product than that in the initial crude melamine is a matter of routine plant control procedure of sampling the purified melamine product and analyzing for its melamine content by the procedure described in American Cyanamid Company's bulletin "Chemistry of Melamine," published 1954 (Leaf 65–3–7500–3/54).

We have found that when more than 3% carbon dioxide, free or combined with ammonia, is present in the material being heated in the digestion step of our process, the amount of hydroxy-triazine impurity present in the melamine crystallized from the digested solution is substantially increased. The melamine synthesis effluents from the high temperature reaction of an aquo-ammono carbonic acid, after quenching with water, and separating the gases evolved under reduced pressure, contain amounts of carbon dioxide in excess of that which, when the pyrolysis product is mixed with water and ammonia, will give a mixture containing more than the maximum of 3% $CO_2$ which should be present in the digestion step of the process of our invention. This is the case even though much of the carbon dioxide formed during the pyrolysis of the aquo-ammono carbonic acid to form melamine may be evolved as a gas upon reduction of the pressure. Accordingly, employing our invention for the treatment of the synthesis effluent, it is stripped of carbon dioxide, preferably by stripping with steam at temperatures of about 100° C. or higher. Its carbon dioxide content is reduced to an amount such that, with addition to the stripped material of such ammonia and water as are required in the digestion step of our process, the carbon dioxide content of the material undergoing digestion is no greater than 3%. Preferably, this material is substantially free from carbon dioxide.

Under atmospheric pressure, ammonia and water would be vaporized from the liquor present in the digestion step at temperatures of about 140° C. and higher. This step, therefore, must be carried out under super-atmospheric pressures to maintain in the liquor the aqueous ammonia of the required concentration and amount during the digestion of the crude melamine.

As a preferred condition for carrying out this digestion step, we have further discovered that when the carbon dioxide content of the material undergoing digestion is maintained below 2%, corrosion of stainless steel by the material being digested is substantially eliminated. This material of construction may then be employed for the digestion vessel. For this reason, and also to obtain a minimum of impurities in the purified melamine product, it is preferred to strip substantially all carbon dioxide from a melamine synthesis effluent or from a crude melamine which is to be subjected to our digestion treatment.

The crude melamine produced by pyrolysis of aquo-ammono carbonic acids commonly is accompanied by impurities other than water, ammonia, carbon dioxide and ammonium carbonates, amounting to about 10% by weight of the melamine present, and they may amount to about 15%. Much of this impurity content consists of hydroxy-triazines and we have heretofore particularly referred to the removal of these impurities by treating a crude melamine in accordance with our invention. We have also discovered there is present in the crude melamine some, as yet unidentified, material which, when the crude melamine is purified by crystallization from its aqueous ammoniacal solution, acts to induce an undesirable tendency of solutions in water of the thus purified melamine to form supersaturated solutions when cooled. We have discovered that by digesting the crude melamine in an aqueous ammoniacal solution under the conditions heretofore described for carrying out this step of our process, this tendency of the purified melamine to form supersaturated solutions is greatly reduced and may be substantially eliminated. By digesting the crude melamine in the aqueous ammonia at 190°–198° C. for a period as short as about 5 minutes, the initial crystallization temperature of a solution in 100 grams water of 4.5 grams of the purified melamine crystallized from the digested solution, is increased by about 30 centigrade degrees above the initial crystallization temperature of a solution in water of the same concentration of melamine obtained by crystallization from a solution of the crude melamine in the aqueous ammonia prior to the digestion at those temperatures. Increasing the time of this digestion to about 12–14 minutes, increases by about 55–60 centigrade degrees this initial crystallization temperature.

For example, a slurry of crude melamine produced by pyrolysis of urea and stripped of its carbon dioxide, contained 16%–17% by weight of total solids and less than 3% by weight carbon dioxide. It was mixed with sufficient anhydrous ammonia to give a 28% ammoniacal solution with the water present. One portion of this mixture was heated to dissolve the melamine, filtered and cooled to about 30° C. to crystallize the melamine. The melamine was filtered off, dried and ground. Another portion of the mixture was digested at 190°–198° C. for a period of 5.2 minutes under 550–710 p.s.i.g. pressure before filtering and cooling the resulting solution to crystallize the melamine, which was filtered off, dried and ground. This product contained 99.5% melamine. Solutions containing 4.5 grams of these purified melamines in 100 grams of water at 100° C. were prepared and slowly cooled. The temperature at which the first sign of melamine crystals appeared in the body of the liquid was noted. For the solution of the melamine purified by the first method, this crystallization temperature was 35° C.; for that of the melamine which had been subjected to the digestion treatment with aqueous ammonia, this crystallization temperature was 67°–69° C. Similar tests, employing digestion times of 11.8 and 14.2 minutes raised the crystallization temperature of the purified melamine to 88°–90° C. and 91°–93° C., respectively, thus showing the tendency of the melamine to supersaturation of its solutions in water had been practically eliminated.

In employing the process of our invention for the purification of crude melamine, minor amounts of undissolved material may be, and usually are, present in the digested melamine. These are removed by filtration of the aqueous ammoniacal solution of the digested material. Color forming impurities, which generally are present in crude melamine, are removed by passing this filtered solution in contact with activated carbon. The hot, digested ammoniacal solution of melamine thus treated is then cooled to crystallize melamine. This melamine is separated from its mother liquor, washed with aqueous ammonia solution to remove adhering mother liquor, and is dried in the usual manner to remove the accompanying water and ammonia.

The mother liquor and wash liquors separated from the crystallized melamine, are preferably distilled to recover their ammonia content and then cooled to crystallize out a mixture of ammelide and ammeline which is separated from the mother liquor. This mother liquor which contains melamine and residual ammelide and ammeline is best employed, together with make-up water as needed, for quenching a hot melamine effluent from which a purified melamine is to be recovered by our process. In this manner substantially all the melamine in a melamine synthesis effluent treated by our process is recovered as a pure melamine product and the hydroxy-triazines are recovered as a by-product. This by-product is preferably incorporated with the aquo-ammono carbonic acid from which the melamine is produced and is thus converted into melamine and is recovered in the purified melamine product of our process.

Our novel procedure in which the crude melamine is digested in aqueous ammonia prior to crystallizing melamine from an aqueous ammoniacal solution, serves to recover a melamine product of the high purity (99% or higher melamine content) with only this one crystallization step. A product analyzing 99.5% or higher melamine and substantially free from insolubles and other impurities is thus readily obtained from the crude melamine. The product is suitably used for the production of melamine-formaldehyde resins and other purposes for which a pure melamine is required.

Our invention is further illustrated by the following specific examples of processes embodying that invention. In the examples amounts of materials are by weight unless otherwise stated. The stated amounts of water present in the several compositions are by difference between 100% and the total percentages of the other materials present. The invention is, however, not limited to the particular procedure or operating conditions of these examples.

The accompanying drawing is a flow sheet showing the several steps of a complete process for the synthesis of melamine from urea and recovery from the crude synthesis effluent of a purified melamine product embodying our invention. The following Example 1 describes in detail a particular procedure illustrated by the drawing.

*Example 1.*—With reference to the drawing, molten urea was supplied to a melamine reactor 1 in which it was heated under a pressure of 2000 p.s.i.g. at a temperature of 425° C. A synthesis effluent containing the following materials was withdrawn from the melamine reactor through a pressure release valve:

| | Percent |
|---|---|
| Melamine | 33.0 |
| Ammelide+ammeline | 2.4 |
| Urea+biuret | 1.8 |
| $NH_3$ | 27.4 |
| $CO_2$ | 35.4 |

The effluent was quenched to about 110° C. with recycled aqueous mother liquor hereinafter particularly described.

The quenched effluent was passed into a stripper 2 in which ammonia and carbon dioxide were stripped from the material by direct contact with steam at 100°–115° C. under a pressure of 10 p.s.i.g. Ammonia and carbon dioxide, accompanied by water vapor, were taken off overhead and a melamine slurry of the following composition was withdrawn from the bottom of the steam stripper:

| | Percent |
|---|---|
| Melamine | 16.4 |
| Ammelide+ammeline | 1.2 |
| Biuret+urea | 0.8 |
| $CO_2$ | Trace |
| Water | 81.6 |

Anhydrous liquid ammonia was introduced into the slurry from stripper 2 in the weight ratio of 1 part $NH_3$/6.5 parts $H_2O$ present in the slurry, equivalent to a 13.3% aqueous ammonia. This ammoniacal slurry was introduced into digester 3, where it was heated to and maintained at 170°–180° C. by adding steam directly. It was held at 170°–180° C. and under pressures in the range 250–300 p.s.i.g. for a residence period of 30 minutes. The solution drawn from digester 3 had the following composition:

| | Percent |
|---|---|
| Melamine | 12.8 |
| Ammelide+ammeline | 1.0 |
| $NH_3$ | 10.3 |
| $CO_2$ | 0.5 |
| Water | 75.4 |

The ammonia and water in this solution corresponds to a 12.0% aqueous ammonia.

The solution from the digester was filtered in filter 4 to remove any solids present, was passed through a bed of activated carbon 5, and was then cooled in crystallizer 6 from the temperature of 170°–180° C. at which it was withdrawn from contact with the activated carbon, to 50° C. to crystallize melamine. The crystallizer was operated under a pressure of 95–100 p.s.i.g. to hold the ammonia present in solution in the liquor from which the melamine is crystallized. The slurry from crystallizer 6 was thickened in a slurry thickener 7, and the thickened slurry passed to a centrifuge 8 where the crystallized melamine was separated from its mother liquor and washed with a 12% aqueous ammonia before being withdrawn and dried to obtain a purified melamine product containing 99.6% melamine with less than 0.1% ammelide+ammeline.

The combined mother liquors and wash liquor from slurry thickener 7 and centrifuge 8 were passed into an ammonia still 9. The ammonia, accompanied by a small amount of carbon dioxide, was removed from the liquor by steam distillation. This is preferably carried out under about 235 p.s.i.g. pressure with top and bottom of column temperatures of about 44° C. and 205° C. respectively. The aqueous solution leaving the bottom of the column was passed to a flash crystallizer 10 in which it was cooled to about 100° C. The ammelide and ammeline which precipitated out was filtered from the mother liquor in a filter 11 and was incorporated with molten urea passed into the melamine reactor for conversion to melamine together with the urea. The mother liquor from filter 11, containing residual melamine and a small amount of ammelide+ammeline, was recycled together with make-up water and employed for quenching hot effluent from melamine reactor 1. In this manner a high yield of the pure melamine is obtained, based on the urea supplied to the process.

*Example 2.*—A molten mixture of biuret and urea was prepared by pyrolysis of urea and mixed with ammelide+ammeline obtained as a by-product in the recovery of pure melamine from a melamine synthesis effluent. The resulting mixture had the following composition:

| | Percent |
|---|---|
| Biuret | 42.9 |
| Urea | 37.1 |
| Cyanuric acid | 11.4 |
| Triuret | 5.4 |
| Ammonia | 0.5 |
| Ammelide+ammeline | 2.7 |

This mixture was pumped to a melamine reactor in which it was heated at 400° C. under 2000 p.s.i.g. pressure. The pressure on the crude melamine effluent was reduced to 15 p.s.i.g. and it was quenched with water. The quenched slurry together with evolved gaseous ammonia and carbon dioxide, had the composition:

| | Percent |
|---|---|
| Melamine | 12.0 |
| Insolubles [1]+urea+biuret | 1.4 |
| $CO_2$ | 113.3 |
| $NH_3$ | 6.3 |
| Water | 67 |

[1] The term insolubles includes total hydroxy-triazine compounds and other materials having low solubilities in water as compared with melamine.

The mixture of slurry and gases was introduced into a steam stripper operated at a bottom of column temperature of 120° C. and 15 p.s.i.g. pressure, in which ammonia and carbon dioxide were removed. Anhydrous ammonia was added to the slurry to give a material having the following composition:

| | Percent |
|---|---|
| Melamine | 13.2 |
| Insolubles+urea+biuret | 1.6 |
| $CO_2$ | Trace |
| $NH_3$ | 23.8 |
| Water | 61.4 |

The $NH_3$/$H_2O$ ratio corresponded to that of a 28% aqueous ammonia. This material was digested under 400 p.s.i.g. pressure at 180° C. for 30 minutes. The resulting solution had the composition:

| | Percent |
|---|---|
| Melamine | 13.3 |
| Insolubles | 0.9 |
| $NH_3$ | 24.2 |
| $CO_2$ | 0.5 |
| Water | 61.1 |

It was passed through a filter and a bed of activated carbon while still at 180° C. and under the pressure of 400 p.s.i.g. The solution was then flash cooled to 40° C. under 60 p.s.i.g. pressure. Melamine crystallized out and was filtered from its mother liquor, washed with water and dried.

The purified melamine thus obtained contained less than 0.1% hydroxy-triazine impurities, and had an ash content of about 5 p.p.m. It exhibited no tendency towards supersaturation when its solution in water was cooled to crystallize melamine therefrom. Both clarified and unclarified solutions of melamine-formaldehyde resin prepared from this purified melamine product had colors less than 20 A.P.H. as determined by the color testing procedures of the American Cyanamid Company's bulletin "Chemistry of Melamine," published 1954 (Leaf 65–3–7500–3/54).

The mother liquor from which the melamine has been separated, and wash liquors are distilled to recover their ammonia content, ammelide and ammeline are crystallized and recycled to the melamine reactor and the mother liquor is used for quenching the hot melamine effluent, as in the process of Example 1.

We claim:

1. The process for the purification of melamine produced by heating at least one of the aquo-ammono carbonic acids, said melamine being accompanied by genetic impurities, including an hydroxy-triazine, which comprises digesting a dispersion of said melamine accompanied by genetic impurities in an aqueous ammonia at temperatures in the range of about 140° C. to about 230° C. while maintaining the concentration of aqueous ammonia in the range of about 8% to about 28% $NH_3$ by weight of the ammonia and water present, said dispersion containing no more than 3% by weight carbon dioxide, and thereafter crystallizing from a solution of the thus treated melamine in an aqueous ammonia, a purified melamine separated from genetic impurities made soluble in the ammoniacal mother liquor from which the purified melamine is crystallized by the aforesaid digesting of the dispersion of melamine and genetic impurities in aqueous ammonia.

2. The process of claim 1 wherein urea is heated to form a synthesis effluent containing melamine accompanied by genetic impurities, including an hydroxy-triazine, this synthesis effluent is stripped of its carbon dioxide by use of steam and ammonia is added to the stripped product in amount such that the dispersion of melamine accompanied by genetic impurities in aqueous ammonia which is digested under about autogenous pressure at about 140° C. to about 230° C. to solubilize genetic impurities, contains about 8% to about 28% $NH_3$ by weight of the ammonia and water present.

3. The process of claim 1 in which a mixture of aquo-ammono carbonic acids principally composed of urea, biuret and cyanuric acid, is heated to form a synthesis effluent containing melamine accompanied by genetic impurities, including an hydroxy-triazine, this synthesis effluent is stripped of its carbon dioxide and ammonia is added to the stripped product in amount such that the dispersion of melamine accompanied by genetic impurities in aqueous ammonia which is digested at about 140° C. to about 230° C. to solubilize genetic impurities, contains about 8% to about 28% $NH_3$ by weight of the ammonia and water present.

4. The process of claim 2 in which the ammonical mother liquor from which the purified melamine is crystallized is freed of its ammonia content, aquo-ammono carbonic acids are crystallized from the ammonia-free liquor, are separated from their mother liquor and are heated together with make-up urea to produce the melamine synthesis effluent, the mother liquor from which aquo-ammono carbonic acids have been separated is introduced into the melamine synthesis effluent, this mixture of mother liquor and synthesis effluent is stripped of its carbon dioxide, and ammonia is added to the stripped mixture to form the aqueous ammonia in which the melamine accompanied by genetic impurities is dispersed.

5. The process for the purification of melamine produced by heating at least one of the aquo-ammono carbonic acids, said melamine being accompanied by genetic impurities including an hydroxy-triazine, which comprises digesting at temperatures in the range of about 140° C. to about 230° C. a solution in aqueous ammonia of said melamine accompanied by genetic impurities while maintaining the concentration of the aqueous ammonia in the range of about 8% to about 28% $NH_3$ by weight of the ammonia and water present, said solution containing no more than 3% by weight carbon dioxide and crystallizing from said ammonia solution a purified melamine separated from genetic impurities made soluble in said ammonia solution, said solution in aqueous ammonia of melamine accompanied by genetic impurities being maintained at said temperatures for a time sufficient to raise by about 30 to about 60 centigrade degrees the initial crystallization temperature of a solution containing 4.5 grams of said purified melamine in 100 grams water, above the initial crystallization temperature of a solution in water of the same concentration of the melamine obtained by crystallization from said solution in aqueous ammonia prior to digesting the solution at said temperatures in the range about 140° C. to about 230° C.

6. The process of claim 1 in which the melamine which is digested in the aqueous ammonia is accompanied by impurities other than water, ammonia, carbon dioxide and ammonium carbonate amounting to more than 1% by weight of the melamine present and the purified melamine crystallized from solution in the aqueous ammonia and dried is at least 99% melamine.

7. The process of claim 2 in which the melamine in the synthesis effluent which has been stripped of its carbon dioxide and ammonia is accompanied by impurities other than water, ammonia, carbon dioxide and ammonium carbonate amounting to more than 1% by weight of the melamine present and the purified melamine crystallized from the solution in aqueous ammonia and dried is at least 99% melamine.

8. The process of claim 3 in which the melamine in the synthesis effluent which has been stripped of its carbon dioxide and ammonia is accompanied by impurities other than water, ammonia, carbon dioxide and ammonium carbonate amounting to more than 1% by weight of the melamine present and the purified melamine crystallized from the solution in aqueous ammonia and dried is at least 99% melamine.

9. The process of claim 4 in which the melamine in the synthesis effluent which has been stripped of its carbon dioxide and ammonia is accompanied by impurities other than water, ammonia, carbon dioxide and ammonium carbonate amounting to more than 1% by weight of the melamine present and the purified melamine crystallized from the solution in aqueous ammonia and dried is at least 99% melamine.

References Cited in the file of this patent

UNITED STATES PATENTS

| | | |
|---|---|---|
| 2,549,492 | Lee | Apr. 17, 1951 |
| 2,566,230 | Mackay et al. | Aug. 28, 1951 |
| 2,647,119 | Haworth et al. | July 28, 1953 |
| 2,918,467 | Hibbitts et al. | Dec. 22, 1959 |

FOREIGN PATENTS

| | | |
|---|---|---|
| 502,844 | Canada | May 25, 1954 |
| 628,250 | Great Britain | Aug. 25, 1949 |
| 628,631 | Great Britain | Sept. 1, 1949 |
| 639,962 | Great Britain | July 12, 1950 |
| 719,662 | Great Britain | Dec. 8, 1954 |

OTHER REFERENCES

McClellan: Industrial and Engineering Chemistry, vol. 32, pages 1184 to 1186 (1940), TP 1. A58.

The Merck Index, 6th Edition, page 61, Merck and Co., Rahway, New Jersey (1952).

Smolin et al.: "s-Triazine and Derivatives," pages 328–9, Interscience Publishers, Inc., New York (February 1959).

Smolin et al.: "S-Triazines and Derivatives," page 272, Interscience Publishers, Inc., N.Y. (February 1959), QD 401 S62.

Beilstein's Handbuch der Organischen Chemie, vol. 26, pages 243–245, System #3889, Verlag Von Julius Springer, Berlin (1937), QD 251 B4.